United States Patent
Orbach

(10) Patent No.: US 8,970,601 B1
(45) Date of Patent: Mar. 3, 2015

(54) SYSTEM AND METHOD FOR GENERATING, TRANSMITTING, AND/OR PRESENTING AN ANIMATION SEQUENCE

(75) Inventor: Tod Orbach, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 190 days.

(21) Appl. No.: 13/601,734

(22) Filed: Aug. 31, 2012

(51) Int. Cl.
*G06T 13/00* (2011.01)

(52) U.S. Cl.
USPC ............................................ 345/473

(58) Field of Classification Search
None
See application file for complete search history.

(56) References Cited

U.S. PATENT DOCUMENTS

| | | | |
|---|---|---|---|
| 7,636,093 B1 | 12/2009 | Kuwamoto | 345/474 |
| 8,134,558 B1 | 3/2012 | Mayhew | 345/473 |
| 2004/0039934 A1 | 2/2004 | Land et al. | 713/200 |
| 2005/0007372 A1* | 1/2005 | Ecob et al. | 345/473 |
| 2009/0129630 A1* | 5/2009 | Gloudemans et al. | 382/103 |
| 2010/0005406 A1* | 1/2010 | Hathaway et al. | 715/764 |
| 2011/0164109 A1 | 7/2011 | Baldridge et al. | 348/43 |

OTHER PUBLICATIONS

Yilmaz et al, Contour-Based Object Tracking with Occlusion Handling in Video Acquired Using Mobile Cameras, 2004, IEEE, vol. 26.*

* cited by examiner

*Primary Examiner* — Kee M Tung
*Assistant Examiner* — Xin Sheng
(74) *Attorney, Agent, or Firm* — Pillsbury Winthrop Shaw Pittman LLP

(57) ABSTRACT

An animation sequence is generated, transmitted, and/or presented to a user. The animation sequence may depict a first object that moves relative to a second object. The second object may partially block the first object in a first portion of the animation sequence that includes a first frame and a second frame. Shape tweening between a masked image of the first object in the first frame and a masked image of the first object in the second frame may be implemented to depict the motion of the first object relative to the second object.

17 Claims, 5 Drawing Sheets

SYSTEM AND METHOD FOR GENERATING, TRANSMITTING, AND/OR PRESENTING AN ANIMATION SEQUENCE

FIELD

The disclosure relates to the generation, transmission, and/or presentation of an animation sequence to a user of a client computing platform where the animation sequence depicts motion of a first object with respect to a second object, and the second object partially blocks a view of the first object during at least first portion of the animation sequence.

BACKGROUND

Various techniques are known for communicating animation sequences to client computing platforms from a server. These include techniques for providing information to a client computing platform that facilitates determinations of views of an individual object between different frames of an animation sequence.

For example, a "shape tween" is a morphing action in which an object is changed from one form to another over a series of frames. By specifying a beginning form and an ending form, a number of frames between an initial frame and an ending frame, the morphing of the object from the beginning form the ending form may be implemented on a client with a limited amount of information and/or instructions being provided from a server. Shape tweening has typically been used to change the shape, color, and/or other aspects of an object in an animation sequence over time.

As another example, where foreground object and background object are moving relative to each other in an animation sequence, and the foreground and background object overlap, a masking operation has been used to mask out the portion of the background object that should not be visible. However, this typically either requires separate image information to be transmitted to the client for individual frames, or for the client to perform the masking operation for the individual frames.

SUMMARY

One aspect of the disclosure relates to generating, transmitting, and/or presenting an animation sequence to a user. The animation sequence may depict a first object that moves relative to a second object. The second object may partially block the first object in a first portion of the animation sequence that includes a first frame and a second frame. The generation, transmission and/or presentation of the animation sequence described herein may reduce the resources (e.g., processing, storage, etc.) required on a client computing platform to present the animation sequence, may reduce the amount of information sent over a network to enable the client computing platform to present the animation sequence, may reduce the cost (e.g., in terms of labor, resources etc.) of generating the animation sequence, and/or enhance other aspects of the transmission, and/or presentation of the animation sequence.

A computer-implemented method of generating the animation sequence and transmitting the animation sequence to a client computing platform may include obtaining primary image information defining the first object in the first frame and the second frame in the animation sequence. The first frame may correspond to a first point in time in the first portion of the animation sequence. The second frame may correspond to a second point in time in the first portion of the animation sequence. As such the second object may partially block the first object in the first frame and in the second frame. The primary image information may define a visual appearance of the first object in the first frame and the second frame if the view of the first object were not blocked.

From the primary image information, first obstructed view pixel information may be determined. The first obstructed view pixel information may define a visible portion of the first object in the first frame of the animation sequence. The pixel information may be determined by applying a mask to the primary image information that corresponds to the shape and position of the second object with respect to the first object in the first frame. The pixel information may specify color value for individual pixels of the first object.

From the primary image information, second obstructed view pixel information may be determined. The second obstructed view pixel information may define a visible portion of the first object in the second frame of the animation sequence. Determining the second obstructed view pixel information may include applying a mask to the primary image information that corresponds to the shape and position of the second object with respect to the first object in the second frame.

From the first obstructed view pixel information, first vector information may be determined. The first vector information may represent the first obstructed view pixel information. The first vector information may specify vector and/or fill for the portions of the first object that are not obstructed by the second object in the first frame.

From the second obstructed view pixel information, second vector information may be determined. The second vector information may represent the second obstructed view pixel information. The second vector information may specify vector and/or fill for the portions of the first object that are not obstructed by the second object in the second frame.

The first vector information and the second vector information may be transmitted to the client computing platform. Instructions may be transmitted to the client computing platform to determine views of the first object in frames between the first frame and the second frame by implementing a shape tween from the first vector information to the second vector information. The use of the shape tween to interpolate the first object in frames between the first frame and the second frame may reduce the amount of information to be transmitted to the client computing device. For example, the first vector information and the second vector information may provide all of the information necessary to perform the shape tween to obtain the views of the first object in the intervening frames. The use of the shape tween may be less processor intensive on the client computing device than other techniques for determining obstructed views of the first object, such as performing masking techniques on the client computing platform at individual intervening frames.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
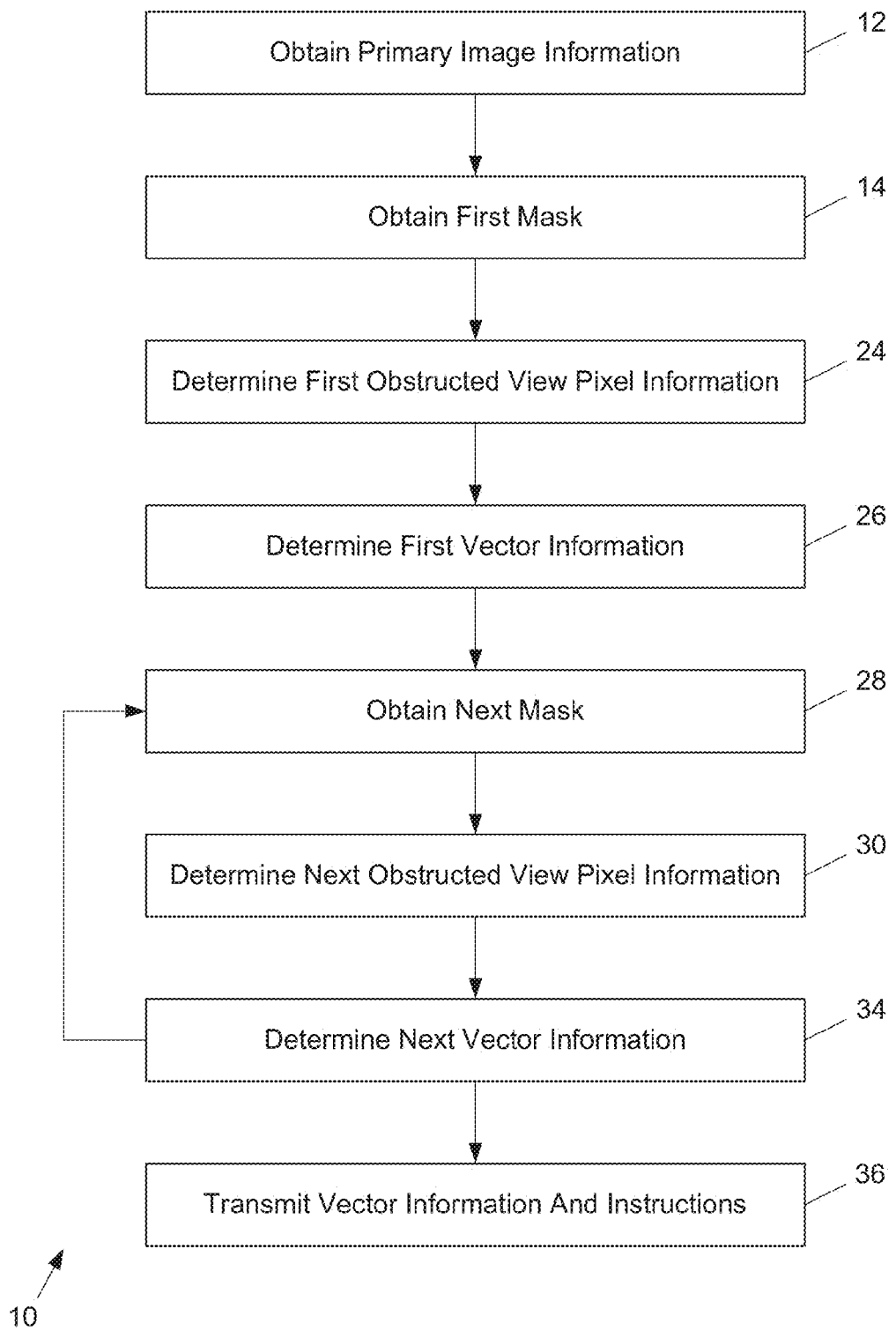
FIG. 1 illustrates a method of generating an animation sequence and transmitting the animation sequence to a client computing platform.

FIG. 1 illustrates a method 10 of generating an animation sequence and transmitting the animation sequence to a client computing platform. The animation sequence may depict motion of a first object with respect to a second object with the second object partially blocking a view of the first object during at least a first portion of the animation sequence. During the first portion, one or both of the first object and the second object may be in motion with respect to a field of view of the animation sequence. For example, the first object, the second object, or the first object and the second object may be in motion with respect to the field of view.

Method 10 may be performed, for example, as part of hosting an online game, hosting an online video, and/or providing other media to users over a network (e.g., the Internet and/or other networks). Method 10 may facilitate rendering and/or display of the animation sequence on the client computing platform. For example, method 10 may reduce the resources (e.g., processing, storage, etc.) required on the client computing platform to render and/or display the animation sequence, may reduce the amount of information sent over the network to enable the client computing platform to render and/or display the animation sequence, and/or enhance other aspects of the transmission, rendering, and/or display of the animation sequence.

At an operation 12, primary image information for the first object may be obtained. The primary image information may define the first object in the first portion of the animation sequence. The primary image information may define the first object in a plurality of frames (e.g., a first frame, a second frame, and/or other frames) of the animation sequence. The primary image information may define a different visual appearance for the first object in different frames of the animation sequence, and/or the primary image information may define a common visual appearance for different frames of the animation sequence. Although FIG. 1 depicts the primary image information for the first object across the first portion of the animation sequence at operation 12, it will be appreciated that this may include a series of separate operations (e.g., obtaining separate sets of primary image information for different sets of one or more frames at different operations). The primary image information for first object in a given frame may include pixel information, vector information, and/or other information defining a visual appearance of the first object in the given frame. Obtaining the primary image information may include accessing stored image information, receiving image information through a user interface, receiving image information over a network, determining image information (e.g., through a game engine), and/or obtaining image information in other ways.

Figure 2:
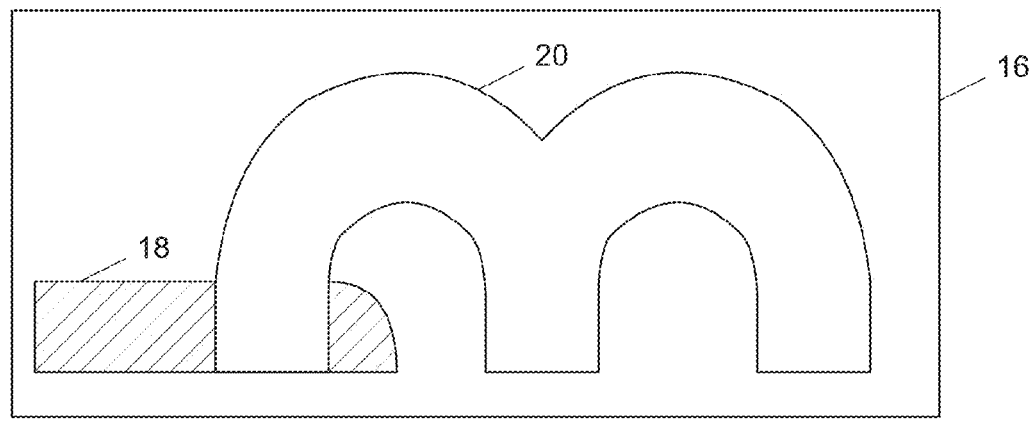
FIG. 2 illustrates a view of a first frame of an animation sequence.
Figure 3:
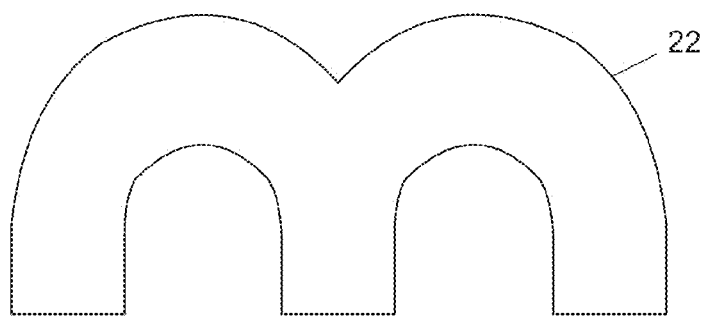
FIG. 3 illustrates a first mask.

At an operation 14, a first mask may be obtained. The first mask may correspond to a shape of the second object in the first frame. By way of illustration, FIG. 2 illustrates a view of first frame 16 including a first object 18 obstructed by a second object 20. FIG. 3 illustrates a first mask 22 that corresponds in shape to second object 20 shown in FIG. 2. It will be appreciated that first mask 22 may reflect the entire shape of corresponding second object 20, or may correspond to a reduced portion of the shape of second object 20 (e.g., the portion of second object 20 depicted in FIG. 2 as blocking first object 18). Returning to FIG. 1, obtaining the first mask may include receiving a definition of the first mask through a user interface, accessing a stored mask, receiving the first mask over a network, determining the first mask from the primary image information, and/or obtaining the first mask through other mechanisms.

Figure 4:
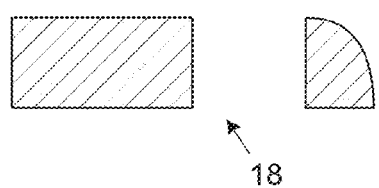
FIG. 4 illustrates a representation of a first object as defined by obstructed view pixel information.

At an operation 24, first obstructed view pixel information may be determined. The first obstructed view pixel information may be determined based on the primary image information for the first frame and the first mask. Such determination may include applying the first mask to the primary image information for the first object in the first frame such that the first obstructed view pixel information defines the portion of the first object visible in the first frame. The first obstructed view pixel information may specify a color value for the pixels of the first object visible in the first frame (e.g., not blocked by the second object). By way of illustration, FIG. 4 illustrates first object 18 as defined by corresponding obstructed view pixel information. The obstructed view pixel information of first object 18 depicted in FIG. 4 may be determined by applying first mask 22 from FIG. 3 to the primary image information for first object 18.

At an operation 26, first vector information representing the first obstructed view pixel information may be determined. This may be determined from the first obstructed view pixel information determined at operation 24. The first vector information may include definitions of vector and/or fill for the first object 18 in the first frame. Operation 26 may include encoding the first vector information into a data object. This could include a flash object and/or other objects.

At an operation 28, a next mask, for example a second mask, may be obtained. The second mask may correspond to the shape of the second object in a second frame in the first portion of the animation sequence. In cases in which the silhouette of the second object (or at least the portion blocking a view of the first object) is unchanged, the second mask may be the same as the first mask. In cases in which the silhouette of the second object has changed between the first frame and the second frame (e.g., due to motion of the second object relative to field of view of the animation sequence), the second mask may be derived from the primary image information for the second object in the second frame. Obtaining the second mask may include receiving a definition of the second mask through a user interface, accessing a stored mask, receiving the second mask over a network, determining the second mask from the primary image information, and/or obtaining the second mask through other mechanisms.

Figure 5:
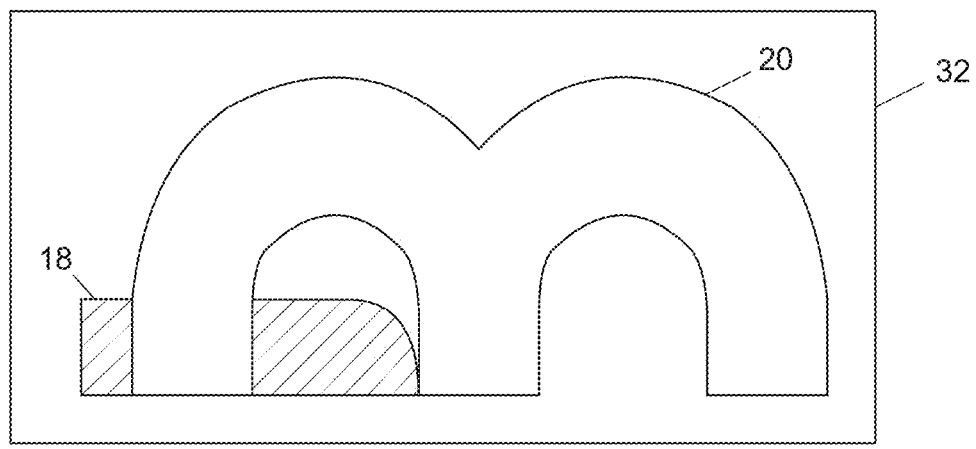
FIG. 5 illustrates a view of a second frame of an animation sequence.
Figure 6:
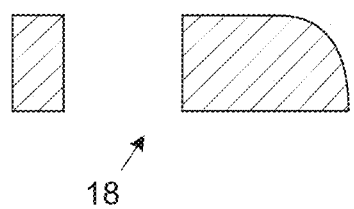
FIG. 6 illustrates a representation of a first object as defined by obstructed view pixel information.

At an operation 30, next obstructed view pixel information defining a visible portion of the first object in a next frame may be determined. This may include second obstructed view pixel information defining a visible portion of the first object in the second frame. The determination of the second obstructed view pixel information may be performed similar to the determination of the first obstructed view pixel information at operation 24. By way of illustration, FIG. 5 depicts a view of a second frame 32 including first object 18 blocked in part by second object 20. Due to relative motion between first object 18 and second object 20 between second frame 32 and first frame 16 illustrated in FIG. 2, a different portion of first object 18 may be masked to determine an obstructed view of first object 18. For example, FIG. 6 provides a representation of second obstructed view pixel information of first object 18 in second frame 32.

Returning to FIG. 1, at an operation 34 next vector information may be determined. The next vector information may include second vector information representing the second obstructed view pixel information. Determination of the second vector information may be based on the second obstructed view pixel information. Determination of the second vector information may be performed the same as or similar to the determination of first vector information at operation 26.

Method 10 may loop back over one or more of operations 28, 30, 34, and/or other operations to create vector information depicting the visible portion of the first object in other frames of the first portion of the animation sequence.

At an operation 36, vector information generated by method 10 may be transmitted to a client computing platform associated with the user. The transmission may be accomplished over the network. The transmission may include wired and/or wireless communication media. The instructions may cause the client computing platform to present the animation sequence to the user. These instructions may include instructions that cause the client computing platform to determine views of the first object in frames between the first frame and the second frame by implementing a shape tween from the first vector information to the second vector information. Shape tweens may be implemented to string together further vector information (e.g., derived through looping over operations 28, 30, and/or 34). Such instructions may control a number of frames between the first frame and the second frame, a frame rate between the first frame and the second frame, and/or other parameters of the animation sequence.

Figure 7:
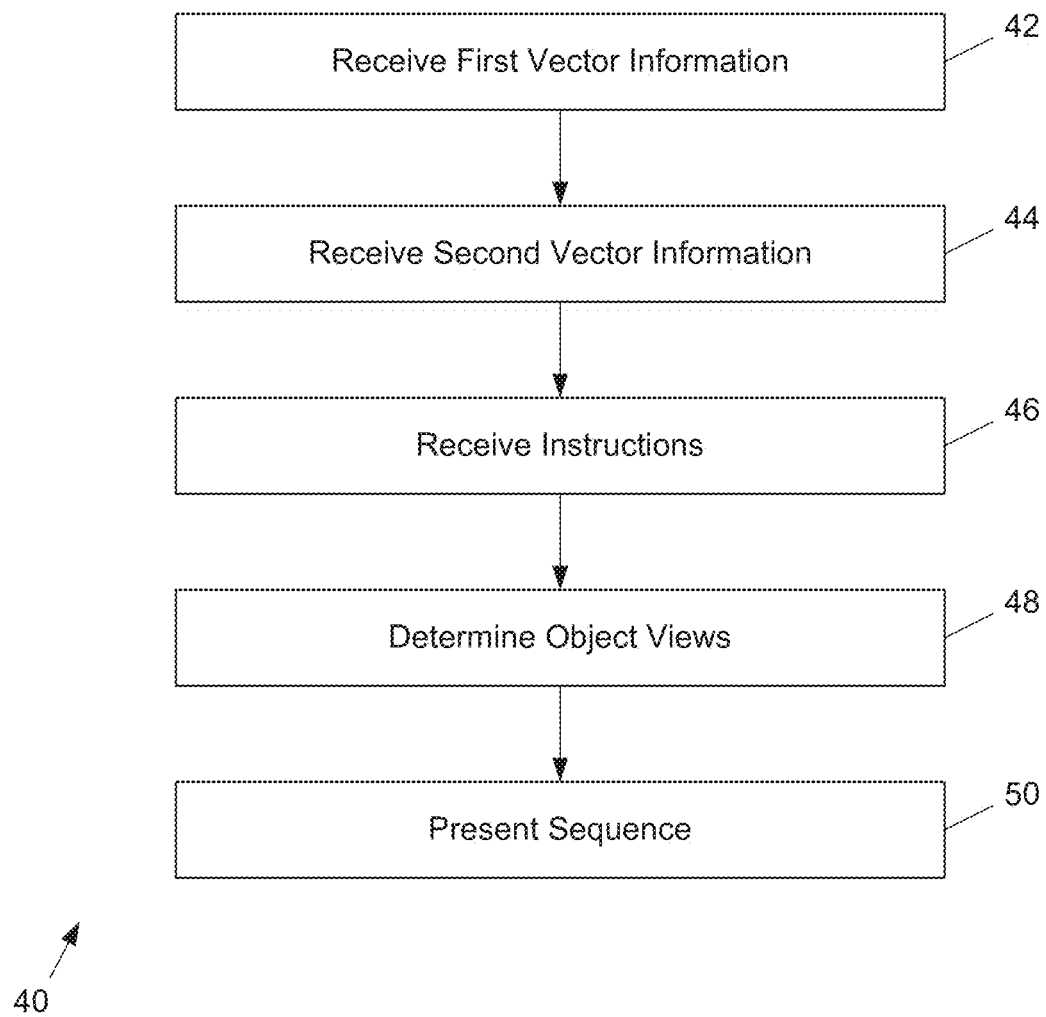
FIG. 7 illustrates a method of receiving and presenting an animation sequence to a user on a client computing platform.

FIG. 7 illustrates method 40 of presenting an animation sequence. The animation sequence may depict motion of a first object with respect to a second object. The second object may partially block a view of the first object during at least a first portion of the animation sequence (e.g., as shown in the view of the frames illustrated in FIGS. 2 and 5). Method 40 may be implemented on a client computing platform configured to present the animation sequence to a user.

At an operation 42, first vector information may be received over a network. The first vector information may define a visible portion of the first object in a first frame of the animation sequence. The first frame may correspond to a first point in time in the first portion of the animation sequence. The visible portion of the first object may be the portion of the first object not blocked by the second object in the first frame. In some implementations, the first vector information may be produced by an operation the same as or similar to operation 26 (shown in FIG. 1 and described herein).

At an operation 44, second vector information may be received over the network. The second vector information may define a visible portion of the first object in a second frame of the animation sequence. The second frame may correspond to a second point in time in the second portion of the animation sequence. In some implementations, the second vector information may be produced by an operation the same as or similar to operation 34 (shown in FIG. 1 and described herein).

At an operation 46, instructions for presenting the animation sequence may be received over the network. The instructions may cause the client computing platform to present the animation sequence to the user. These instructions may include instructions that cause the client computing platform to determine views of the first object in frames between the first frame and the second frame by implementing a shape tween from the first vector information to the second vector information. Shape tweens may be implemented to string together further vector information (e.g., derived through looping over operations 28, 30, and/or 34). Such instructions may control a number of frames between the first frame and the second frame, a frame rate between the first frame and the second frame, and/or other parameters of the animation sequence.

At an operation 48, views of the first object in frames between the first frame and the second frame may be determined in accordance with the instructions received at operation 46. This may include implementing a shape tween to determine the views of the first object in these frames.

At an operation 50, the animation sequence may be presented to the user. This may include displaying the frames of the animation sequence to the user on an electronic display of the client computing device.

The operations of methods 10 and 40 presented herein are intended to be illustrative. In some implementations, method 10 and/or 40 may be accomplished with one or more additional operations not described, and/or without one or more of the operations discussed. Additionally, the order in which the operations of methods 10 and/or 40 are illustrated in FIGS. 1 and/or 7 and described herein is not intended to be limiting.

In some implementations, methods 10 and/or 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 10 and/or 40 in response to instructions stored electronically on an electronic storage medium. The one or more processing devices may include one or more devices configured through hardware, firmware, and/or software to be specifically designed for execution of one or more of the operations of methods 10 and/or 40.

Figure 8:
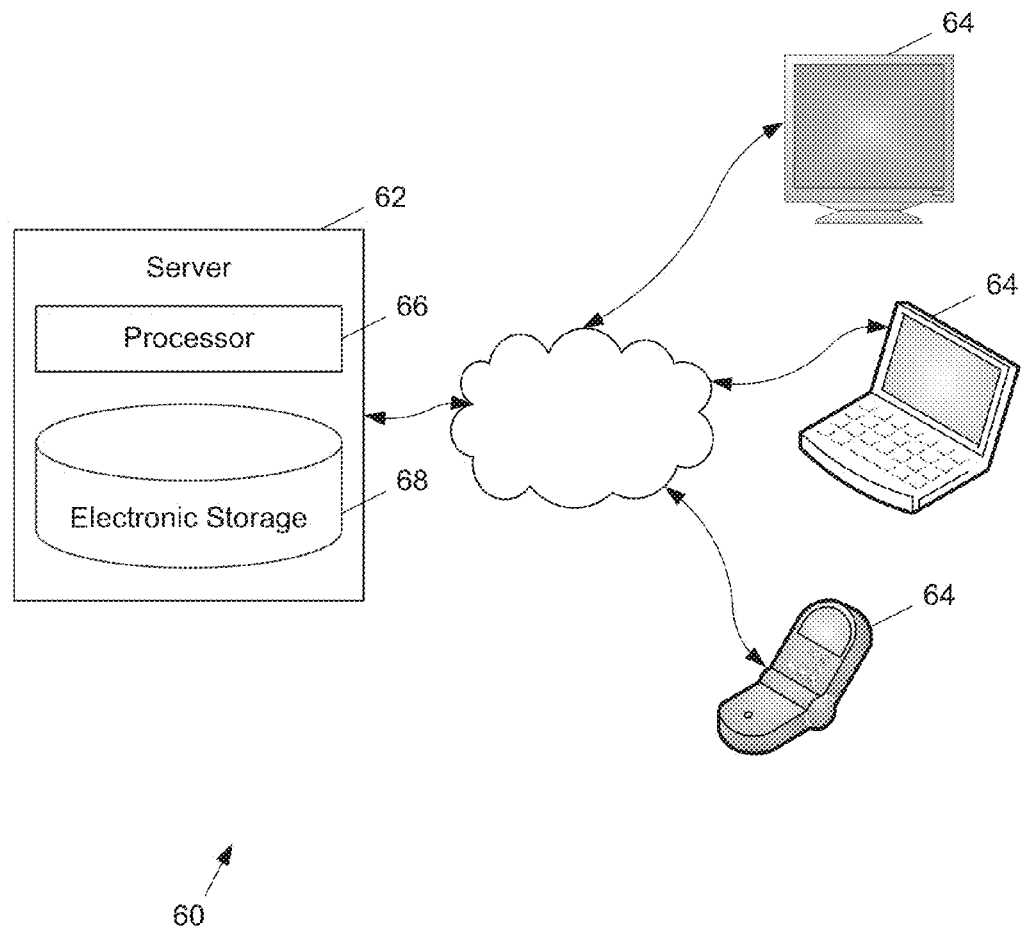
FIG. 8 illustrates a system configured to generate and present an animation sequence to a user.

FIG. 8 illustrates a system 60 configured to generate and present an animation sequence to users. As can be seen in FIG. 8, system 60 may include one or more of a server 62, one or more client computing devices 64, and/or other components.

Server 62 may be configured to communicate with client computing devices 64 in a server/client architecture. By way of non-limiting example, server 62 may be configured to host an online game, a virtual space, an online video, and/or other content. The content hosted by server 62 may include an animation sequence served to client computing devices 64 by server 62. Server 62 may include one or more processors 66, electronic storage 68, and/or other components.

Processor 66 may provide information processing capabilities within server 62. Although processor 66 is shown in FIG. 8 as a single entity, this is not intended to be limiting, as processor 66 may include a plurality of processors operating in coordination or cooperation. This may include implementations in which server 62 includes multi-processor device, a farm of server devices operating together, and/or virtual resources provided by the cloud. Processor 66 may be configured to provide information to client computing platforms 64 over a network that causes client computing platforms to present the animation sequence to users. For example, processor 66 may be configured to perform some or all of the functionality described herein with respect to method 10 (shown in FIG. 1).

Electronic storage 68 may electronic storage media that electronically stores information non-transiently. The electronic storage media of electronic storage 60 may include one or both of system storage that is provided integrally (i.e., substantially non-removable) with server 62 and/or removable storage that is removably connectable to 62 via, for example, a port (e.g., a USB port, a firewire port, etc.) or a drive (e.g., a disk drive, etc.). Electronic storage 68 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 68 may include virtual storage resources, such as storage resources provided via a cloud and/or a virtual private network. Electronic storage 68 may store software algorithms, information determined by processor 66, information received from client computing platforms 64, and/or other information that enables server 62 to function properly.

Electronic storage 68 may non-transiently store information prior to transmission to client computing platforms 64 that causes client computing platforms to present the animation sequence to users. For example, such information may include first vector information (e.g., as determined at operation 26 shown in FIG. 1 and described herein), second vector information (e.g., as determined at operation 34 and described herein), instructions for implementing first and/or second vector information (e.g., as described with respect to operation 36 shown in FIG. 1 and described herein, and/or as described with respect to operation 50 shown in FIG. 7 and described herein), and/or other information.

Client computing platforms 64 may be computing platforms configured to provide an interface with users and system 60. A given client computing platform 64 may include one or more processors, electronic storage that non-transiently stores information, and/or other components. By way of non-limiting example, the given client computing platform may include one or more of a smartphone, a handheld computer, a tablet device, a personal digital assistant, a laptop computer, a desktop computer, and/or other platforms. In presenting the animation sequence to a user, the given client computing platform 64 may be configured to perform some or all of the functionality described herein with respect to method 40 shown in FIG. 7.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of generating an animation sequence and transmitting the animation sequence to a client computing platform, the method being implemented in a computer system comprising one or more processors configured to execute computer program modules, the animation sequence depicting motion of a first virtual object with respect to a second virtual object with the second virtual object partially blocking a view of the first virtual object during at least first portion of the animation sequence, the method comprising:

obtaining primary image information, the primary image information defining the first virtual object in a first frame and defining the first virtual object in a second frame in the animation sequence depicting the motion of the first virtual object with respect to the second virtual object in an online game, wherein the first frame corresponds to a first point in time in the first portion of the animation sequence and the second frame corresponds to a second point in time in the first portion of the animation sequence, wherein the second frame is non-adjacent to the first frame and wherein the second virtual object partially blocks the first virtual object in the first frame and in the second frame;

determining first obstructed view pixel information defining a visible portion of the first virtual object in a first frame of the animation sequence, the first frame corresponding to a first point in time in the first portion of the animation sequence, wherein such determining includes applying a mask to the primary image information that corresponds to the shape and position of the second virtual object with respect to the first virtual object in the first frame;

determining second obstructed view pixel information defining a visible portion of the first virtual object in the second frame of the animation sequence, the second frame corresponding to a second point in time in the first portion of the animation sequence, wherein such determining includes applying a mask to the primary image information that corresponds to the shape and position of the second object with respect to the first virtual object in the second frame;

determining first vector information representing the first obstructed view pixel information;

determining second vector information representing the second obstructed view pixel information; and causing the first vector information and the second vector information to be transmitted to the client computing platform with instructions for the client computing platform to determine views of the first virtual object in multiple frames between the first frame and the second frame by implementing a shape tween from the first vector information to the second vector information.

2. The method of claim 1, wherein the first obstructed view pixel information and the second obstructed view pixel information are bitmaps.

3. The method of claim 1, further comprising encoding the first vector information and the second vector information into separate data objects.

4. The method of claim 3, wherein the data objects are flash objects.

5. The method of claim 1, wherein the second virtual object is stationary in a field of view of the animation sequence between the first frame and the second frame.

6. The method of claim 1, wherein the second virtual object is in motion in a field of view of the animation sequence between the first frame and the second frame.

7. The method of claim 1, wherein the primary image information for the first frame and the second frame are the same.

8. Non-transitory electronic storage media storing information related to an animation sequence, the animation sequence for presentation to users during an online game depicting motion of a first virtual object with respect to a second virtual object with the second virtual object partially blocking a view of the first virtual object during at least first portion of the animation sequence, the stored information comprising:
   first vector information defining a visible portion of the first virtual object in a first frame of the animation sequence, the first frame corresponding to a first point in time in the first portion of the animation sequence, wherein the visible portion of the first virtual object in the first frame is the portion of the first virtual object that is not blocked by the second virtual object in the first frame;
   second vector information defining a visible portion of the first virtual object in a second frame of the animation sequence, the second frame corresponding to a second point in time in the first portion of the animation sequence wherein the second frame is nonadjacent to the first frame, wherein the visible portion of the first virtual object in the second frame is the portion of the second virtual object that is not blocked by the second virtual object in the second frame; and
   instructions for a client computing platform to determine views of the first virtual object in multiple frames between the first frame and the second frame by implementing a shape tween from the first vector information to the second vector information for presentation to users during an online game.

9. The electronic storage media of claim 8, wherein the first vector information and the second vector information are separate data objects.

10. The electronic storage media of claim 9, wherein the data objects are flash objects.

11. The electronic storage media of claim 8, wherein the second virtual object is stationary in a field of view of the animation sequence between the first frame and the second frame.

12. The electronic storage media of claim 8, wherein the second virtual object is in motion in a field of view of the animation sequence between the first frame and the second frame.

13. A computer-implemented method of presenting an animation sequence, the method being implemented on a client computing platform, the animation sequence for presentation to users during an online game depicting motion of a first virtual object with respect to a second virtual object with the second object partially blocking a view of the first virtual object during at least first portion of the animation sequence, the method comprising:
   receiving over a network from a server, first vector information defining a visible portion of the first virtual object in a first frame of the animation sequence, the first frame corresponding to a first point in time in the first portion of the animation sequence, wherein the visible portion of the first virtual object in the first frame is the portion of the first virtual object that is not blocked by the second virtual object in the first frame;
   receiving over a network from the server, second vector information defining a visible portion of the first virtual object in a second frame of the animation sequence, the second frame corresponding to a second point in time in the first portion of the animation sequence and wherein the second frame is nonadjacent to the first frame, wherein the visible portion of the first virtual object in the second frame is the portion of the second virtual object that is not blocked by the second virtual object in the second frame; and
   determining views of the first virtual object in multiple frames between the first frame and the second frame by implementing a shape tween from the first vector information to the second vector information for presentation to users during an online game.

14. The method of claim 13, wherein the first vector information and the second vector information are separate data objects.

15. The method of claim 14, wherein the data objects are flash objects.

16. The method of claim 13, wherein the second virtual object is stationary in a field of view of the animation sequence between the first frame and the second frame.

17. The method of claim 13, wherein the second virtual object is in motion in a field of view of the animation sequence between the first frame and the second frame.

* * * * *